Nov. 23, 1926.
L. BILLÉ
1,608,197
JOINT FOR PIPES AND THE LIKE
Filed April 24, 1922    2 Sheets-Sheet 1
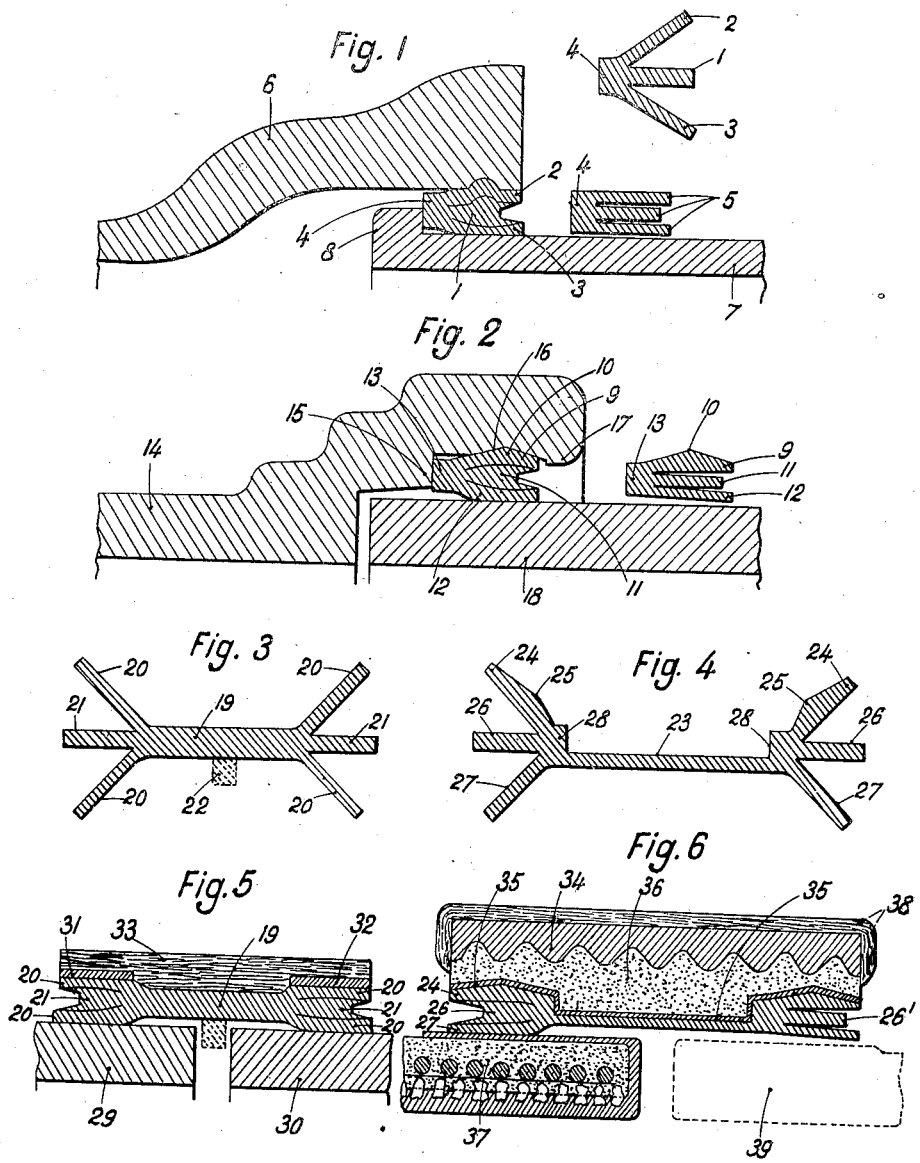
Inventor
L. Billé,
By Marks & Clerk
Attys Nov. 23, 1926.
L. BILLÉ
1,608,197
JOINT FOR PIPES AND THE LIKE
Filed April 24, 1922   2 Sheets-Sheet 2
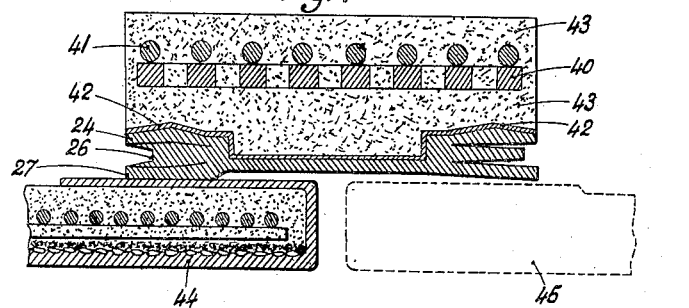
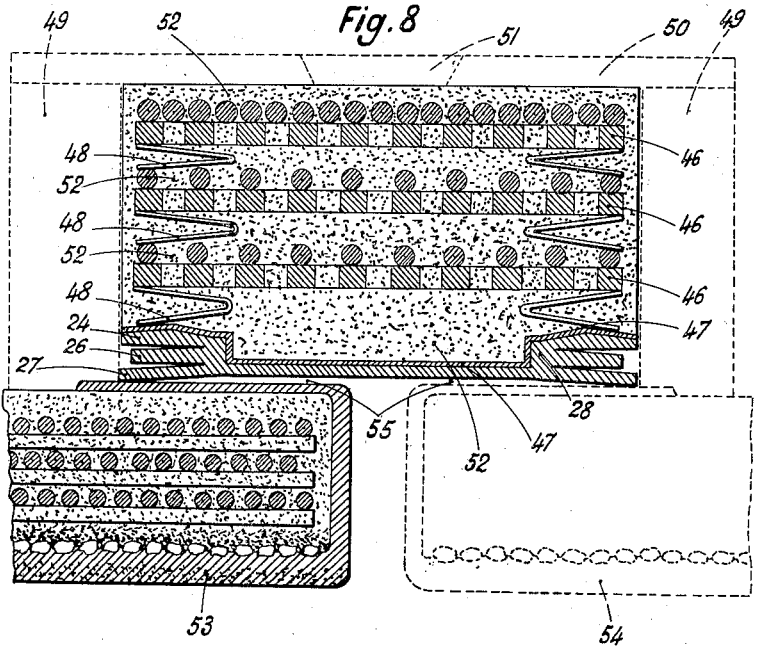
Inventor
L. Billé,
By Marks&Clerk
Attys Patented Nov. 23, 1926.

1,608,197

UNITED STATES PATENT OFFICE.

LÉON BILLÉ, OF NOGENT SUR MARNE, FRANCE.

JOINT FOR PIPES AND THE LIKE.

Application filed April 24, 1922, Serial No. 556,282, and in France January 20, 1922.

This invention relates to joints for pipes and the like formed:

1st—By malleable metallic rings united by a heel or base portion made in one piece which are placed in the space between the two pipes or in coupling collars or coupling rings.

2nd—By cement rings reinforced with rings of steel or other metal, plain or perforated, with or without steel wire reinforcement and without ties, surrounding the rings of malleable metal.

The central strip or intermediate strips of the rings of malleable metal subsequently upset by caulking, hammering or compression so as to force the outer of wing portions of the rings against the walls of the pipes and the rings thereby ensuring perfect fluid tightness of the joints.

In order that the invention may be clearly understood, reference is made to the accompanying drawings whereon—

Figure 1 shows in section a sleeve or socket joint in accordance with the present invention.

A strip of malleable metal comprising a central portion 1, two wings 2 and 3 and a base 4 or heel portion, said strip being forced in a lead press or cast in a suitable mould or rolled, the central portion 1 being shorter, equal to or longer than the wings or portions 2, 3 respectively. The outer and inner portions 2, 3 are subsequently flattened or set back onto the central portion 1 so as to form a strip 5 of metal which is bent into a ring and driven in between the two pipes 6, 7 to be pointed. A flange 8 provided on the inner pipe 7 acts as a stop for the heel or base portion of the ring 5. The central portion 1 is upset by caulking. During the caulking period the central portion 1 opens the wings or portions 2, 3 apart and compresses these against the walls of the pipes so that they conform perfectly to the form thereof.

Figure 2 shows in section another form of socket or sleeve joint. The outer wing 9 of the ring of malleable metal is made with a triangular enlargement 10 which is formed in the press during forcing of the strip as above described. The wings 9 and 12 are flattened or forced onto the central portion 11. The jointing strip is subsequently bent into a ring and placed in position in a recess in the pipe 14 which is provided with a shoulder 15 intended to act as a stop for the heel or base part 13 of the joint. The pipe 14 is also provided with a recessed part 16 of the same form as the triangular enlarged portion 10 of the outer portion 9 of the ring. A beaded portion 17 projecting inwardly of the pipe 14 may be formed on the end of the said pipe so as to retain the joint during transport and positioning of the pipes. The joint may be soldered if so desired after clamping the jointing ring in the space between the two pipes. The pipe 18 is introduced in situ into the aforesaid space and it is only necessary to caulk the central part 11 of the ring in order to force the outer and inner portions 9 and 12 against the walls of the pipes 14 and against the outer surface of the end of the pipe 18. Packing of the joint may be completed by caulking malleable metallic wires therein.

Figures 3 and 4 show two further constructional forms of jointing rings made of malleable metal.

The strip which forms the ring 19 shown in Figure 3 is made by casting in one piece in a mould or forced in a press simultaneously with the wing portions 20—20 and the two central portions 21 and if so desired with a part 22 adapted for use in ultimately centering the joint. The two central portions 21 may be shorter, equal to, or longer than the wing portions 20.

The constructional form of ring shown in Figure 4 comprises the part 23, wing portions 24 with enlargements 25, the two central portions 26, the two inner wing portions 27 and the two heel or base portions 28. The two central portions 26 may be longer, equal to or shorter than the wing portions 24 and 27.

Figure 5 shows the application of the constructional form of jointing ring shewn in Figure 3. The wing portions 20 are flattened or forced onto the central portions 21. The blank is then bent into a ring of a diameter to permit of its being mounted on the pipes 29 and 30 and the joint may then be soldered, proper precautions being taken to avoid sticking by soldering of the wing and central portions. This ring is mounted on the ends of the pipes to be assembled and a ring or collar 31 of steel or other suitable metal is positioned above and on one end of the joint ring, another ring 32 or a collar being mounted on the other end of the joint ring. The two central portions 21 are then caulked so as to compress or force the wing portions 20 against the rings or collars 31, 32 and the adjacent surfaces of the pipes 29, 30. The joint may be protected by a layer 33 of jute impregnated with asphalt, cement or other suitable material. The pipes may be supplied or delivered with the joint mounted and caulked on the end of one of the pipes so that the other pipe can be inserted into the jointing ring and the central portion 21 thereafter caulked in order to complete the fluid tight assembly of the pipes in situ.

Figure 6 shews the application of the constructional form of ring shewn in Figure 4 in combination with a corrugated or ribbed ring 34 of steel or other metal. The wing portions 24 and 27 are forced onto the central portions 26, and the blank is then bent to a diameter slightly larger than that of the ends of the pipes to be assembled or jointed. The jointing ring is then soldered, care being taken to avoid adherence by soldering of the wing portions 24—27 to the central portions 26. A layer 35 or coating of asphalt is then applied to the exterior of the ring in order to isolate the metal from the cement mortar 36. The interior of the ring may also be coated with a layer of asphalt or a sheet of asphalt may be caused to adhere thereto so as to protect the ring against the action of injurious waters. A layer 36 of cement is provided between the ring 34 and the jointing ring. Then after setting of the cement mortar the ring is mounted or positioned on the end of the pipe 37, which may be formed of asphalt or reinforced cement as described in the specification of my application for Letters Patent; or the aforesaid ring may be mounted or positioned on the end of any other pipe having a cylindrical end. The central portion 26 is upset by hammering, caulking or compression which forces the wing portions 24, 27 against the walls of the pipe and the ring. If so desired the metallic ring 34 may be protected by a layer 38 or covering of jute or other suitable material impregnated with asphalt or cement mortar. The above operations can be effected in advance or in situ as desired. In order to effect the last operations in situ the pipe 39 is positioned to the required length in the joint ring as shewn in Figure 6; the central portion 26′ is then swelled either by hammering, caulking or compression so as to force the wing portions 24, 27 against the walls of the pipe 39 and the ring.

Figure 7 shews a jointing ring having the form of that shewn in Figure 4 as applied for jointing purposes in combination with a ring 40 of plain or perforated sheet steel bent and soldered at its joint. This ring may be reinforced in case of necessity by a helical winding of steel wire 41, the ends of which are soldered onto the ring 40. The wing portions 24 and 27 (Figure 4) of the blank are flattened or forced onto the central portions 26. The blank is bent to form a ring of a diameter slightly greater than that of the ends of the pipes to be jointed and the joint of the ring is soldered as hereinbefore explained. A sheet 42 or layer of asphalt or other desired material is applied to the exterior of the joint ring and in case of necessity also to the interior thereof. The ring 40 of malleable metal and the helically wound layer of wire 41 are embedded in a layer of cement mortar 43. After setting of the mortar 43 the joint ring is mounted or positioned on the ends of the pipes 44, 45 either beforehand or in the factory or in situ and the joint is then completed as hereinbefore described with reference to Figure 6. In this constructional application of the ring there may be any number of rings 40 and helically wound layers of wire 41 of any desired pitch all according to the pressures which the joint is to withstand.

Figure 8 shews a jointing ring formed in situ on the pipes already laid, the jointing ring being of the kind shewn in Figure 4. In this arrangement a plurality of plain or perforated sheet steel rings 46 are shewn, these rings being bent and soldered at their joints and each being reinforced by one or more than one steel wire winding. After flattening or compression of the wing portions 24, 27 of the blank of Figure 4 onto the central portions 26, the blank is bent directly on the pipes to a diameter corresponding to that of the ends of the pipes and the junction is then soldered, care being taken to avoid adherence by soldering of the wing portions to the central portions. The ring is then placed in position, then its exterior is covered with a layer of asphalt or a sheet 47 of asphalt is applied adhesively to the exterior thereof. The plain or perforated sheets 46 with the wire windings are then placed in position centering of these parts being ensured by V-shaped ties 48 or ligatures which may be loose or soldered to the rings 46. A collar 49 is placed at each end of the joint and the whole is surrounded by an iron sheet 50 perforated with one or more than one hole 51. Cement mortar 52 is run in through the hole 51 thus embedding the wire wound rings 46, the wire windings and the malleable metallic jointing ring. After the cement mortar has sufficiently set the elements 49, 50 of the mould are removed and when the mortar is quite hard or sufficiently hard, the central portions 26 are upset by caulking, hammering or compressing in order to force the wing portions 24, 27 tightly against the walls of the pipes 53, 54 and against the jointing ring. The heel or base portions 28, Figure 4, butt or press against the cement mortar 52.

In all the aforesaid joints and after caulking, there remains sufficient space 55 between the central part of the jointing ring of malleable metal and the ends of the pipes so that the latter may bend slightly or accommodate themselves to the ring without danger of rupture of the pipes or of the ring. Instead of one central portion, two or other suitable number of these may be used.

The thickness of the central and wing portions may be equal or unequal.

The interior packing of the joints may be completed by caulking malleable metallic wires therein, if necessary.

The invention is not limited to the various arrangements shewn in the drawings but may be applied to all kinds of joints in which the compression is effected by a malleable ring provided with a recess or recesses in which a ring or rings are provided during making of the strip, which are subsequently caulked, hammered or compressed to effect expansion or swelling of the joint, Such a joint has numerous advantages. The interior or inner portions are so situated as to be very economically manufactured; the wing portions of the ring adapt themselves strictly to the walls of the pipes and to those of the collars or rings; the joint once expanded by the interior caulking, hammering or compression is perfectly fluid tight and it offers great resistance to high pressures. Further placing or positioning of the joint is very easily effected, the cost of the joint being very low.

Claims:

1. As a new article of manufacture, a strip of malleable metal adapted to be bent into a ring like form to provide a pipe joint, said strip including a base portion and integral central and outer extensions, the base portion constituting an abutment for engagement with a pipe member to facilitate caulking of the central extension whereby the outer extensions are caused to separate and produce a fluid tight joint.

2. An article of manufacture as claimed in claim 1 characterized in that the combined thickness of the several extensions substantially corresponds to the thickness of the base portion.

3. As a new article of manufacture, a pair of oppositely arranged ring like members constructed according to claim 1 characterized by the provision of a reduced web-like member connecting the bases of the ring like members.

In testimony whereof I have signed my name to this specification.

LÉON BILLÉ.